United States Patent [19]

Evans

[11] Patent Number: 5,114,457
[45] Date of Patent: May 19, 1992

[54] SOIL AMENDMENT

[75] Inventor: James R. Evans, Carlsbad, Calif.

[73] Assignee: John J. Feehan, III, Palm Desert, Calif.

[21] Appl. No.: 352,920

[22] Filed: May 17, 1989

[51] Int. Cl.⁵ .......................... C05F 11/00; C05F 5/00; C05C 9/02
[52] U.S. Cl. .......................... 71/23; 71/26; 71/64.13; 71/903; 71/28
[58] Field of Search .............. 71/23, 25, 26, 28, 64.13, 71/903, 904

[56] References Cited

U.S. PATENT DOCUMENTS

| 2,092,100 | 4/1937 | Waynick | 71/23 |
| 2,995,434 | 8/1961 | Burton | 71/23 X |
| 4,707,176 | 11/1987 | Durham | 71/23 |

FOREIGN PATENT DOCUMENTS 2463109  3/1981  France ................. 71/23

Primary Examiner—Ferris Lander
Attorney, Agent, or Firm—Dennison, Meserole, Pollack & Scheiner

[57] ABSTRACT

A soil amendment is disclosed containing, by volume, about 20 to 60% cross-cut redwood grains or ground redwood bark of a particle size substantially in the range of 0.5 to 3 mm, about 15 to 50% grape pumice, about 0 to 20% cross-cut fir grains of a particle size substantially in the range of 0.5 to 3 mm, about 0 to 20% agricultural pumice and about 0 to 25% aged whole rice hulls.

16 Claims, No Drawings

SOIL AMENDMENT

BACKGROUND OF THE INVENTION

This invention relates to the field of soil additives for lawns, trees and planter beds.

A number of factors are important in determining the ability of soil to support plant life. Among the crucial factors are the presence of humus and organic matter, together with the availability of essential elements, the ability to retain water, the creation of a good soil structure for microbial activity, cation exchange capacities, sodium absorption ratios, aminization, ammonification, nitrification, pH buffering and mineralization. To properly support plant life, the organic and carbohydrate content of the soil must be in the proper ratio to sand, silt and clay. Moreover, the growth of plant life cannot take place without soil microbes which make available nitrogen to the plants and which break down organic materials.

Cultivation of plants is especially difficult in the sand and clay based soils found, for example, in many areas of southern and central California, as well as Arizona and Nevada. The pH of such soils may be very high, in the range of 7.8 to 8.9. Moreover, very sandy soils are organically deficient, and substantially without microbial activity. In addition, rainfall in such areas is scarce, and water is therefore at a premium, while the soil qualities do not permit retention of water.

The rapidly expanding population of the Southwestern United States, as well as the resort and tourism based economy of many areas relying on golf courses, has made it important to develop methods of economically cultivating grasses and other landscape plants in soils which make such cultivation very difficult. Among the materials suggested for addition to soils to improve cultivation are expanded mica, peat moss, straw, and corn cobs. U.S. Pat. No. 2,780,031 suggests the use of hydrated tricalcium silicate of small particle size for mixture with soils, while U.S. Pat. No. 3,323,898 discloses expanded perlite as a soil amendment material. The use of synthetic resins, such as polyacrylonitriles, and polyvinyl pyrrolidone is known from U.S. Pat. No. 4,762,545, but these polymeric materials tend to be costly.

SUMMARY OF THE INVENTION

It is therefore an object of the invention to provide a soil amendment material to improve cultivation of lawns, trees and planter beds in sandy and clay based soils.

It is a further object of the invention to provide a soil amendment material which enables retention of available water for plants under cultivation.

It is another object of the invention to provide a soil amendment material to acidify soils with a high pH.

It is another object of the invention to provide a soil amendment material providing an improved environment for mineralization and increased microbial activity.

In order to achieve these and other objects, the invention provides a soil amendment comprising, by volume:

about 20 to 60% cross-cut redwood grains or ground redwood bark of a particle size substantially in the range of 0.5 to 3 mm;

about 15 to 50% grape pumice;

about 0 to 20% cross-cut fir grains of a particle size substantially in the range of 0.5 to 3 mm;

about 0 to 20% agricultural pumice; and about 0 to 25% aged whole rice hulls.

The amendment will generally have a pH in a range of about 3.4 to 4.5, and a content of redwood grains, ground bark and fir grains together of about 20 to 60% by volume.

DETAILED DESCRIPTION OF THE INVENTION

The soil amendment of the invention is based on the use of cross-cut redwood grains having a particle substantially in the range of 0 5 to 3 mm. In order to obtain such grains, the redwood must be cut across the grain; redwood cut with the grain will yield shavings and splinters which cannot be granulated to the same extent, and which will not absorb nitrate and ammonium forms of nitrogen as well. The desired redwood grains according to the invention will have the consistency of ground coffee. Redwood grains and/or bark will generally make up about 20 to 60% by volume of the soil amendment composition, and preferably about 30 to 50% by volume.

In some applications, it is possible to substitute finely ground redwood bark for cross-cut redwood. The redwood bark will also have a particle size substantially in the range of 0.5 to 3 mm. While finely ground redwood bark can be used ° for planters, lawns and fairways, cross-cut redwood grains should be used for golf greens.

Because the cutting of redwood is somewhat restricted and redwood may be in short supply, a portion of the redwood may be substituted with cross-cut fir of a similar consistency to the redwood, 0.5 to 3 mm in size. The composition of fir makes it not as beneficial as redwood but it is an adequate substitute in most situations. The fir grains will be present at a level of about 0 to 20% by volume.

The redwood and fir components provide to the composition of the invention bulk, carbohydrate, water retention and beneficial decomposition products. Moreover, the redwood and fir are preferably supplemented by treatment with nitrogen and iron containing compounds. This may be done by spraying the cross-cut, ground wood with aqueous solutions containing urea formaldehyde, a slow release form of nitrogen, at a level of 3 to 4% by weight of nitrogen and ferrous sulfate at a level of about 10% by weight, corresponding to 3% by weight iron.

The soil amendment of the invention also comprises about 15 to 50% by volume grape pumice, and preferably 20–40%, depending on soil profile and fertility. Grape pumice, a commercially available material that is a by-product of grape processing, contains the peels and stems of the grape, ground and dried. The result is a sticky material which is able to hold the composition together, and which is rich in nitrogen, phosphorous, zinc and ash. Grape pumice also has a low pH of approximately 2.9–3.4 which is beneficial for reducing the alkalinity of desert soils, and southern California soils in general.

When grape pumice is used to reduce the pH of the soil, the amount of grape pumice in the composition will depend on the starting pH of the soil, the desired pH, and the soil profile. For example, treatment of a sandy soil of pH 8.2 will require a composition containing 30–35% by volume grape pumice to reduce the pH to 6.9. A clay soil of pH 8.4 would utilize an amendment with 20% by volume grape pumice, less than would be required by a sandy soil, because it is not desired to increase the stickiness of clay soils.

Grape pumice will also be added to an amendment used with soils having a lower pH, in order to provide potassium, nitrogen, zinc and ash. For example, an amendment used with a sandy soil of pH 6 will contain about 15% by volume grape pumice. The compositions of the invention may also contain agricultural pumice, a volcanic rock about 3 to 5 mm in particle size. Pumice is known to be porous and absorbent, and has previously been used for introducing amending and conditioning agents into soil, as disclosed in U.S. Pat. No. 2,765,291. In the present compositions, pumice serves a dual purpose. Due to its porosity, pumice will aerate the soil. Moreover, the sharp edges of the pumice grains will cut through clay soils, separating the clay particles. This is important in increasing water infiltration into the soil. While the compositions of the invention may contain about 0 to 20% by volume pumice, compositions intended for use with clay soils will generally contain pumice in the upper portion of the range, and will contain larger particle sizes to create more air porosity.

The soil amendment of the invention also contains about 0 to 25% by volume aged whole rice hulls. Whole rice hulls, aged for at least about one year, have been found to absorb a very large quantity of water, approximately 70 times their weight. Shredded rice hulls and rice hulls that have not been aged have been found to have little capacity to hold water. Moreover, rice hull ash, which is known for use in plant growth media from U.S. Pat. No. 4,707,176, has a lesser capacity to hold water.

Sandy soils having higher water infiltration rates require compositions containing 20-25% rice hulls, while sandy clay soils require compositions containing 5-15% rice hulls. With clay soils, compositions with 5-10% aged rice hulls are preferred.

The compositions of the invention will generally have a pH in the range of about 3.4 to 4.5, the most effective range for treatment of desert soils having a pH in the range of 7.8 to 8.9.

The resultant soil amendment enables the maintenance of high traffic turf grasses in soil such as those found in southern California having high pH, high salinity and high sodium content. The amendment is also designed to regulate water infiltration rates, air porosity, and soil interfacing in both grassy areas and planter beds, and will regulate available water in the soil and create an environment conducive, especially in sandy base soils, for autotrophic and heterotrophic microbial activity.

The amendment of the invention has a fairly high density, often in the range of about 28-32 pounds per cubic foot. Because of this density, the particles will not easily wash away when watered, and therefore the amendment is good for hillsides and other areas where it is difficult to retain soil As an example, experimental evidence indicates that only about 2% of a composition according to the invention floats after two hours in water, while other soil amendment compositions float to an extent of about 90% after the same soaking time.

The soil amendment compositions of the invention are especially useful in cultivating fairways and greens of golf courses where texture and quality of the resulting grass is important, where grass often must be grown on hillsides, and where water conservation is necessary to reduce maintenance costs. The compositions are also useful in other landscape applications, such as for lawns and planter beds. Other agricultural applications for these compositions are also contemplated.

The amendment may be applied to soil straight, or may be mixed with silica-base sand to form a mixture containing about 5-20% by weight sand, the sand providing an improved structure for the soil. Ferro-magnesium silica sand is preferred for its addition of nutrients. When mixed with sand, more frequent applications of amendment may be necessary.

The particular composition of the soil amendment of the invention will depend upon the soil to which it is to be added, the type of plant life to be grown and the use to which that soil is to be placed.

Thus, a composition intended for close cut golf greens in sandy soil will omit rice hulls and agricultural pumice since these currently would interfere with close-cut mowing. Planter beds having sandy soil, and fast water infiltration rates of 20-60 in$^3$/hr require rice hulls in the composition which will flocculate, aerate and reduce the water infiltration rate. Planter beds with clay soil will require agricultural pumice in the composition which will help separate soil colloids of clay, and assist water infiltration and aerify the soil particles. The same principles apply in formulating compositions for use with longer fairway grasses and lawns, with greater amounts of aged rice hulls preferred for sandy soils and greater amounts of agricultural pumice preferred for clay soils.

Use of the soil amendment according to the invention reduces requirements for both water and fertilizer. The amount of reduction of the requirements will depend on the conditions of use, the composition of the amendment, and the assay of the amendment, e.g., % nitrogen, phosphorus and potassium.

The following are examples of compositions according to the invention.

EXAMPLE 1

A composition is prepared for treatment of golf greens containing 60% by volume cross-cut redwood of particle size approximately 2 mm and 40% by volume grape pumice. The redwood is nitrified between 2 and 3% and treated to retain 10% ferrous sulfate, a net 3% iron by weight. The resultant material has a density of 31.5 pounds per cubic foot and a moisture of 4%. An analysis of this material indicates:

| | |
|---|---|
| N = | 4.1% by weight |
| NO$_3$ = | 280 PPM |
| P$_2$O$_5$ = | 2.15% by weight |
| K$_2$O = | 5.9% by weight |
| Ca++ = | 1.4% by weight |
| Mg++ = | 641 PPM |
| Mn++ = | 1 PPM |
| Zn++ = | 7.2 PPM |
| Ash = | 7.6% by weight |

The soil amendment is applied by a drop type spreader, applying 1 cubic foot per 100 square feet to a net ⅛ inch depth or 2 cubic feet per 100 square feet to a net ¼ inch depth. When applied straight, the soil amendment is preferably applied four times per year. The soil amendment may also be mixed with silica-base sand in a ratio of 20% by weight sand to 80% by weight soil amendment. Applied as a mixture, it may be applied 4 to 8 times per year, depending on soil conditions, existing water, soil salinity, etc.

EXAMPLE 2

A composition is prepared for treating a soil containing 15% clay, 70% sand and 15% silt. The composition contains 30% by volume nitrified redwood grains, 10% by volume nitrified fir grains, 30% by volume grape pumice, 10% by volume agricultural pumice, and 20% by volume aged whole rice hulls. The product has a density of 28.5 pounds per cubic foot and a moisture content of 4%. An analysis of the product indicates that it contains:

|   |   |
|---|---|
| N = | 4.2% by weight |
| $NO_3$ = | 280 PPM |
| $P_2O_5$ = | 2.5% by weight |
| $K_2O$ = | 6.5% by weight |
| $Ca^{++}$ = | 1.6% by weight |
| Ash = | 8.1% by weight |
| $Na^+$ = | 600 PPM |
| $Mg^{++}$ = | 686 PPM |
| $Zn^{++}$ = | 19 PPM |

9.85 cc of this composition are placed in 100 cc water in a graduated cylinder. After 2 hours, 9.65 cc of the composition have fallen to the bottom of the cylinder.

This amendment is applied to golf greens with a drop spreader, 1 cubic foot per 100 square feet applied straight four times per year or 1 cubic foot per 100 square feet applied eight times per year in a mixture with 20% by weight silica-base sand. The mixture may also be applied to fairways in an amount of 2 cubic feet per 100 square feet, once per year or to planter beds in an amount of 3 cubic feet per 100 square feet, twice per year.

In an application of this soil amendment, with 1 inch worked 4 inches deep into the soil, the following data has been found to apply:

|   |   |
|---|---|
| stored $H_2O$ = | 1.75" in top 3½" soil |
| available $H_2O$ = | 1.66" in top 3½" soil |
| unavailable $H_2O$ = | 0.34" in top 3½" soil |
| air filled porosity = | 12% |
| $H_2O$ infiltration rate = | 4.5" per hour |

EXAMPLE 3

A soil amendment is prepared for use with a soil containing 70% clay, 20% silt and 10% sand, pH over 7.5, the amendment containing 45% by volume nitrified redwood grains, 15% by volume nitrified fir grains, 20% by volume grape pumice, 15% by volume 3 mm agricultural pumice, and 5% by volume aged whole rice hulls.

What is claimed is:

1. A soil amendment comprising, by volume:
   about 20 to 60% cross-cut redwood grains or ground redwood bark of particle size substantially in the range of 0.5 to 3 mm;
   about 15 to 50% grape pumice;
   about 0 to 20% cross-cut fir grains of a particle size substantially in the range of 0.5 to 3 mm;
   about 0 to 20% agricultural pumice; and
   about 0 to 25% aged whole rice hulls.

2. A soil amendment according to claim 1, wherein said redwood grains or ground bark are fortified with nitrogen, iron, or a mixture thereof.

3. A soil amendment according to claim 2, wherein said redwood grains or ground bark are fortified with nitrogen by spraying with an aqueous solution of urea formaldehyde.

4. A soil amendment according to claim 1, wherein said redwood grains or ground bark have a particle size substantially in the range of 1 to 3 mm.

5. A soil amendment according to claim 1, containing about 5 to 20% agricultural pumice.

6. A soil amendment according to claim 1, containing about 10 to 20% aged whole rice hulls.

7. A soil amendment according to claim 1, comprising 50 to 60% redwood grains and 40 to 50% grape pumice.

8. A soil amendment according to claim 1, comprising about 30 to 40% redwood grains or ground bark, about 10 to 20% fir grains, about 25 to 35% grape pumice, about 5 to 15% agricultural pumice and about 15 to 25% aged whole rice hulls.

9. A soil amendment according to claim 1, mixed in an amount of approximately 80 to 95% by weight with silica-base sand.

10. A soil amendment according to claim 1, having a density of about 28 to 32 pounds per cubic foot.

11. A soil amendment according to claim 1, having a pH of about 3.4 to 4.4.

12. A soil amendment according to claim 1, having a total content of redwood grains, ground bark and fir grains of about 20 to 60% by volume.

13. A soil amendment for treatment of soils having high contents of sand and/or clay, high pH and high salinity and subjected to scarce rainfall, said amendment having a pH in the range of about 3.4 to 4.5 and a density in the range of about 28 to 32 lbs/ft³, and comprising, by volume:
   about 20 to 60% cross-cut redwood grains or ground redwood bark of particle size substantially in the range of 0.5 to 3 mm;
   about 15 to 50% grape pumice;
   about 0 to 20% cross-cut fir grains of a particle size substantially in the range of 0.5 to 3 mm;
   about 0 to 20% agricultural pumice; and
   about 0 to 25% aged whole rice hulls.

14. A soil amendment according to claim 13 for soils having a high sand content, containing about 5-25% by volume of said whole aged rice hulls.

15. A soil amendment according to claim 13 for soils having a high clay content, containing about 15-20% by volume of said agricultural pumice.

16. A soil amendment according to claim 13, wherein said grains or bark are fortified with nitrogen and iron.

* * * * *